July 9, 1946.   N. E. GADDINI   2,403,516
FRUIT HALVING AND PITTING MACHINERY
Filed May 1, 1944   11 Sheets-Sheet 2

INVENTOR
N. E. Gaddini
BY
ATTORNEYS

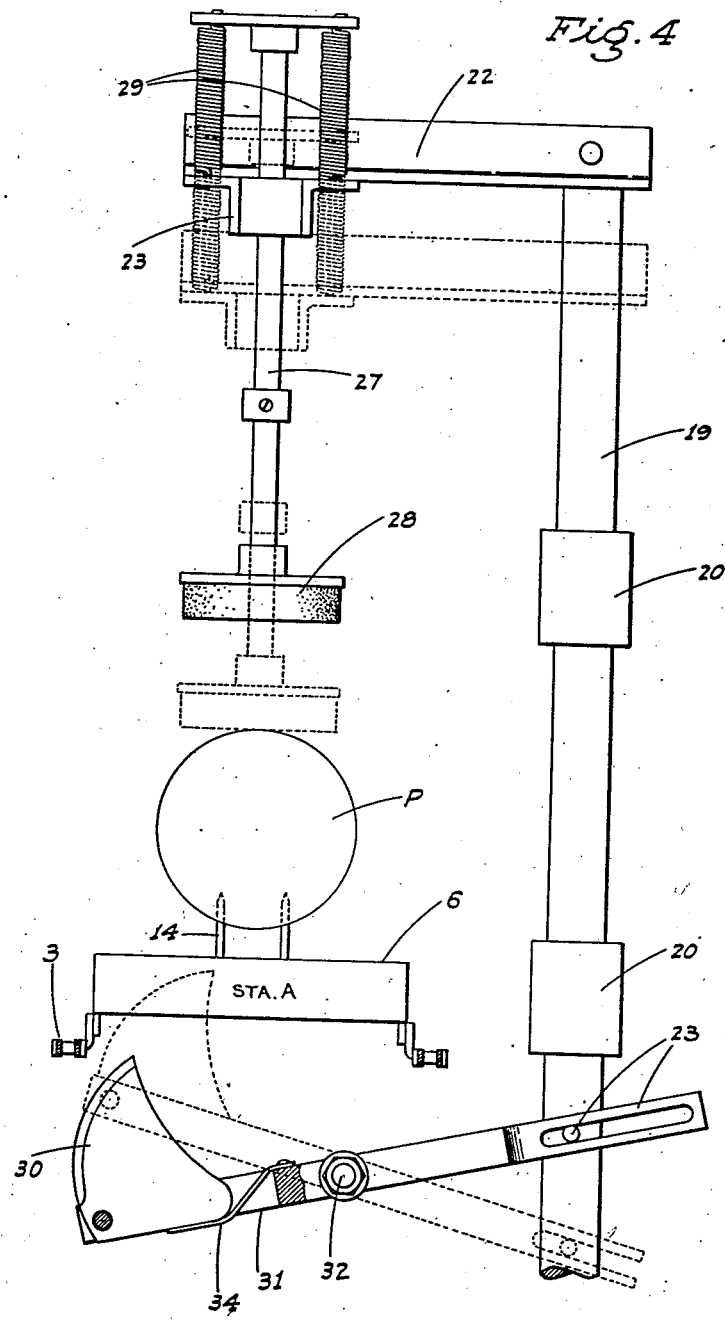

July 9, 1946.　　　　N. E. GADDINI　　　　2,403,516
FRUIT HALVING AND PITTING MACHINERY
Filed May 1, 1944　　　11 Sheets-Sheet 4
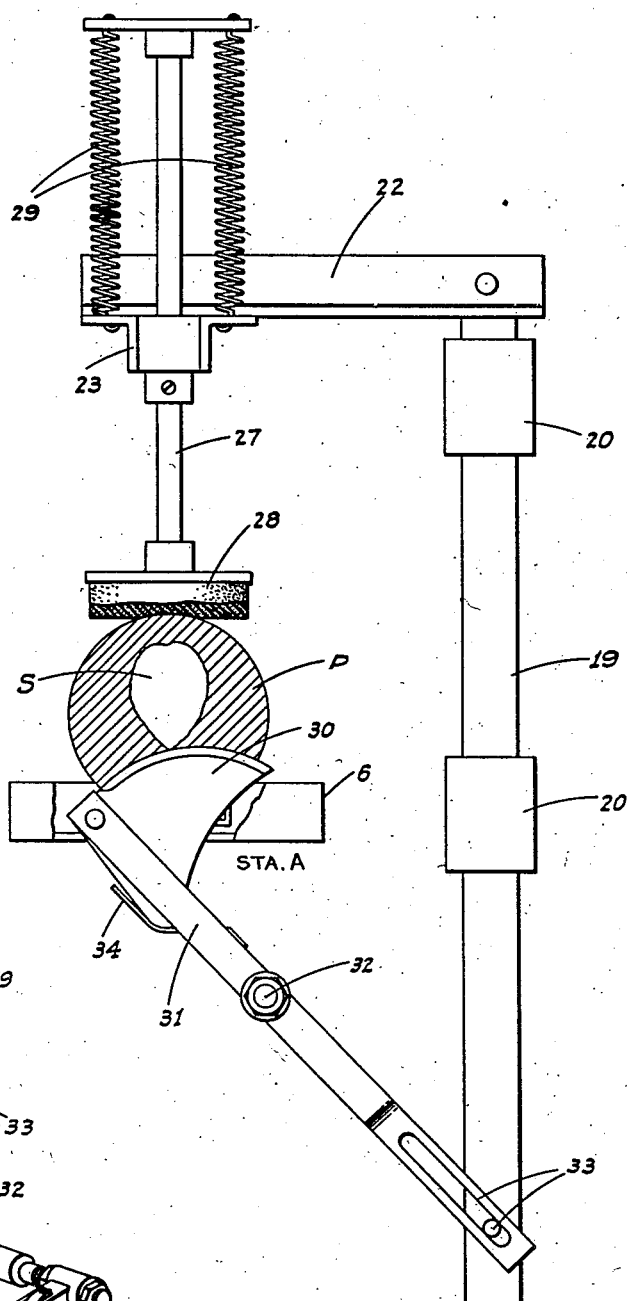
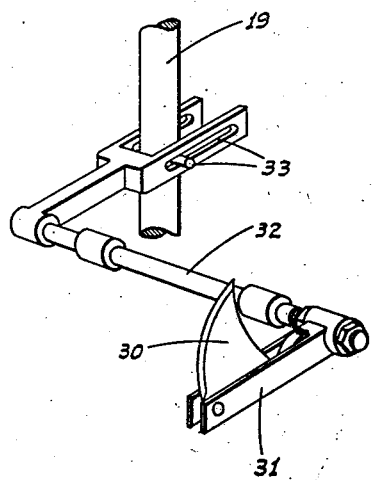
INVENTOR
N. E. Gaddini
BY
ATTYS July 9, 1946. N. E. GADDINI 2,403,516
FRUIT HALVING AND PITTING MACHINERY
Filed May 1, 1944 11 Sheets-Sheet 5
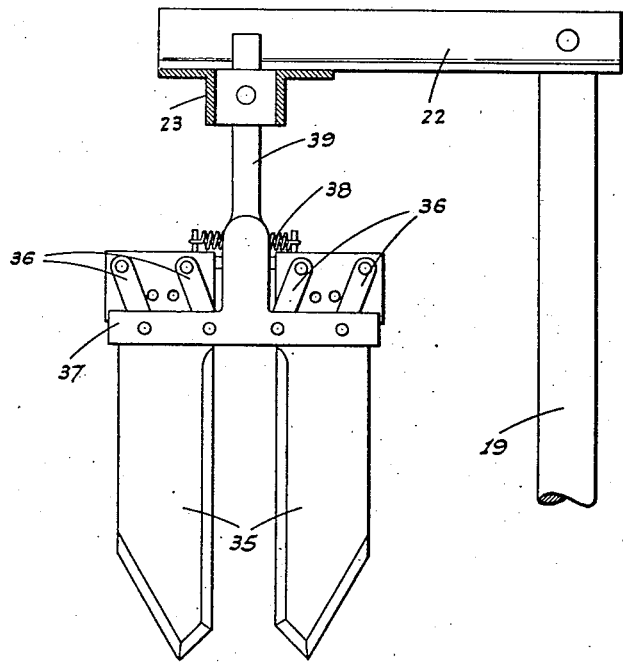
Fig. 7
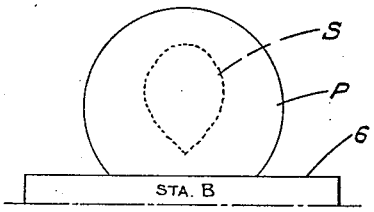
Fig. 8
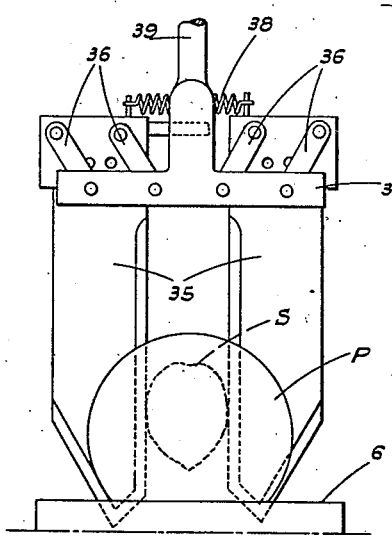
INVENTOR
N. E. Gaddini
BY
ATTYS

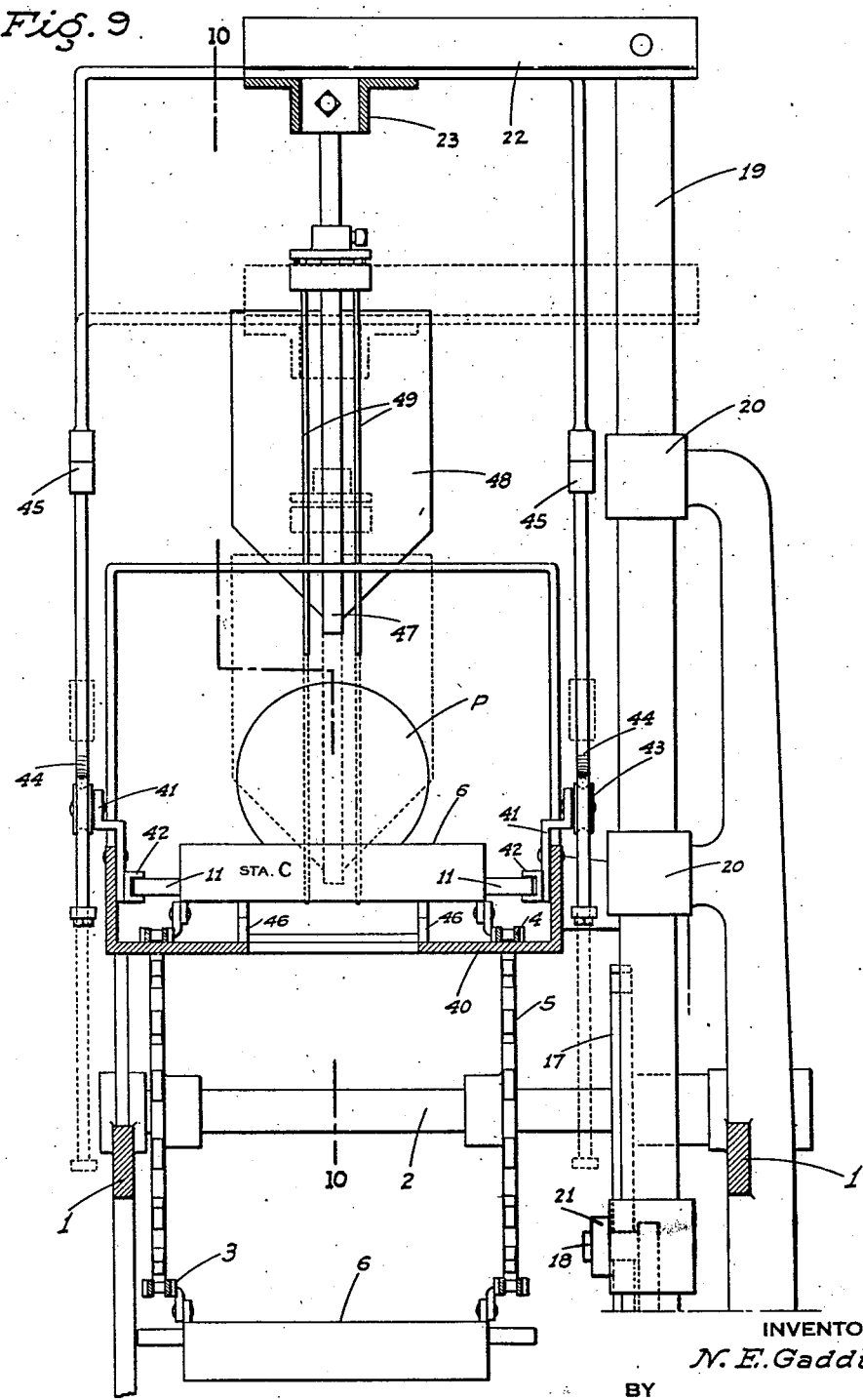

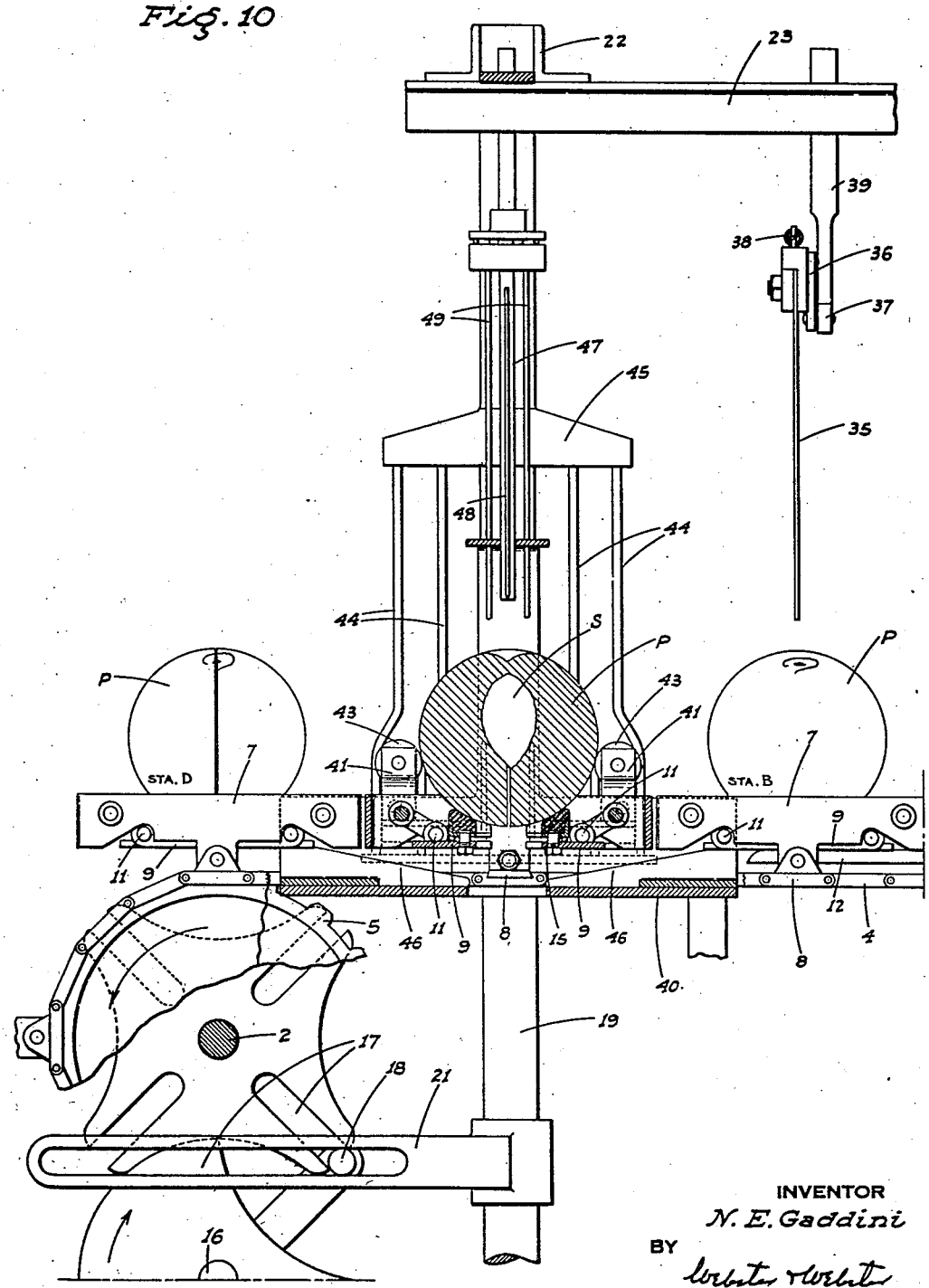

July 9, 1946.   N. E. GADDINI   2,403,516
FRUIT HALVING AND PITTING MACHINERY
Filed May 1, 1944   11 Sheets-Sheet 8

INVENTOR
*N. E. Gaddini*
BY
*ATTYS*

July 9, 1946.   N. E. GADDINI   2,403,516
FRUIT HALVING AND PITTING MACHINERY
Filed May 1, 1944    11 Sheets-Sheet 9

INVENTOR
N. E. Gaddini
BY
ATTYS

July 9, 1946.   N. E. GADDINI   2,403,516
FRUIT HALVING AND PITTING MACHINERY
Filed May 1, 1944   11 Sheets-Sheet 10
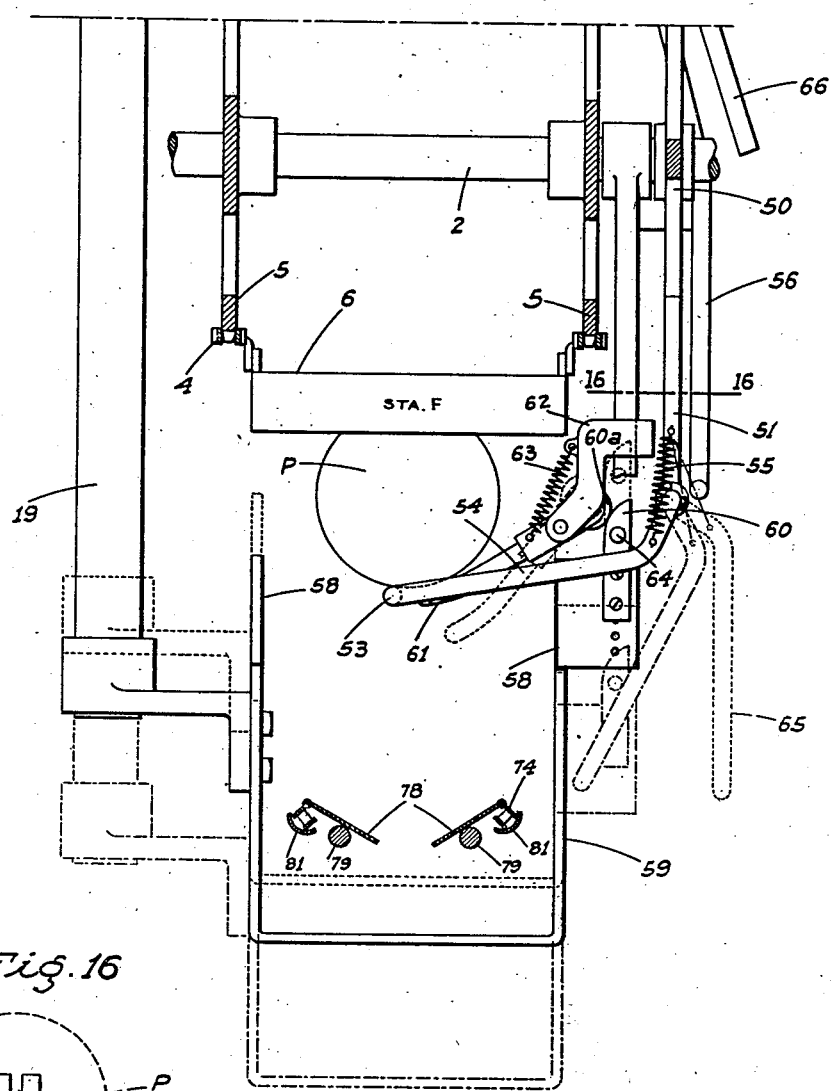
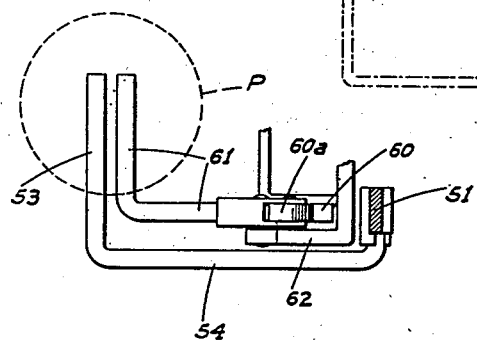
INVENTOR
N. E. Gaddini
BY
ATTYS

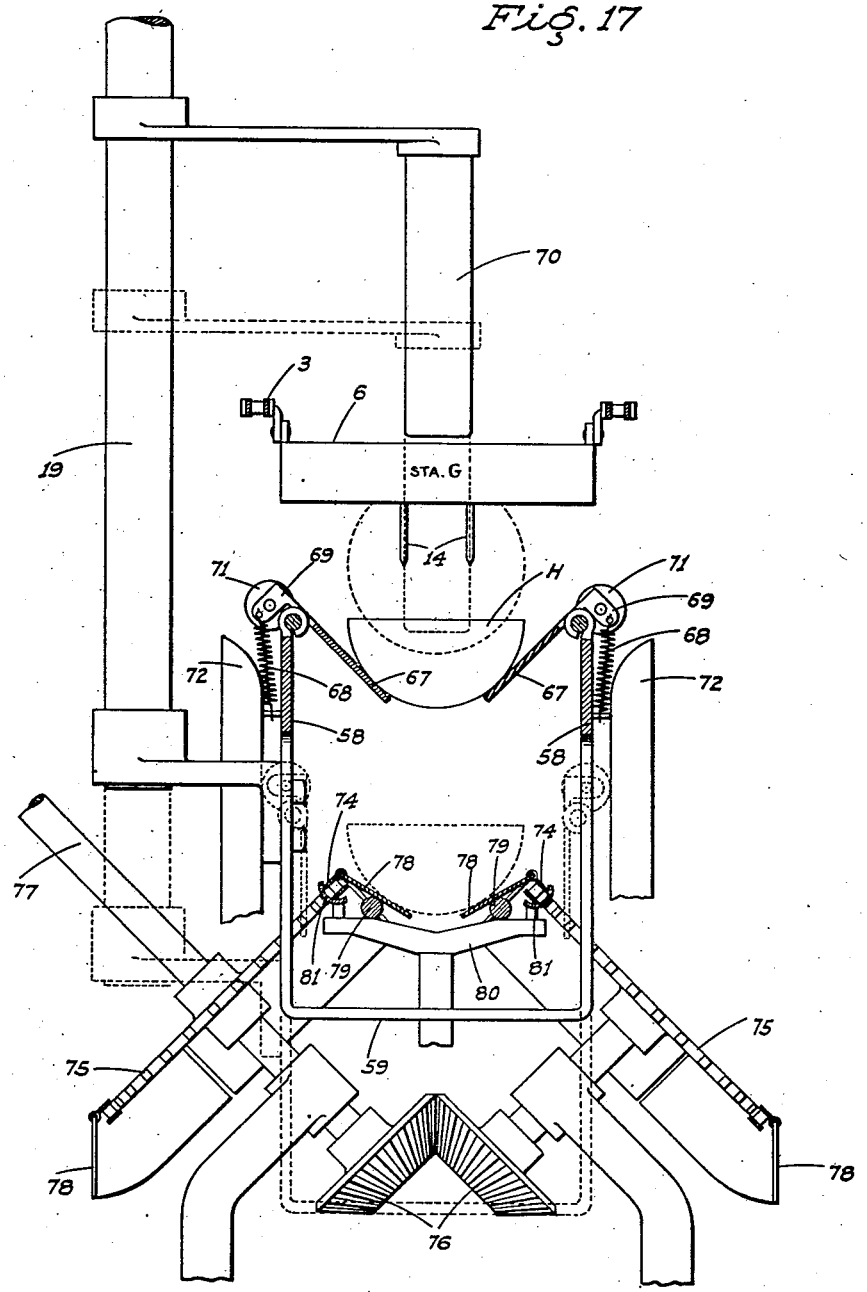

Patented July 9, 1946

2,403,516

UNITED STATES PATENT OFFICE 2,403,516

FRUIT HALVING AND PITTING MACHINERY

Norman E. Gaddini, Winters, Calif.

Application May 1, 1944, Serial No. 533,548

17 Claims. (Cl. 146—28)

This invention relates in general to fruit machinery, and in particular the invention is directed to, and it is an object to provide, a power driven, automatic machine for stone fruit, such as peaches and apricots, which machine is operative in continuous and progressive order to cut the fruit into halves, eject the pit from between said halves, and to then distribute said halves on a carry-off conveyor.

An additional object of this invention is to provide a fruit halving, pitting, and distributing machine which is designed to accomplish such operations quickly, inexpensively, and without any substantial scratching or bruising of the fruit halves; the machine being capable of producing satisfactory results with fruit which is immature (hard-green) or over-ripe (soft), as well as with fruit of proper maturity (firm-ripe), for processing. The machine also will effectively halve and pit fruit, such as peaches, having split pits, and the pit when ejected does not contact the cut halves.

A further object of the invention is to provide an automatic fruit handling machine which comprises, in combination, a main, endless conveyor having a plurality of fruit holders mounted thereon and each adapted to receive and support a single fruit, the conveyor being advanced with an intermittent or step-by-step movement whereby the fruit progressively moves to predetermined stations at which the holders remain stationary for a given period of time, and mechanism operative when said holders are stationary to halve and pit the fruit; such mechanism embodying, at adjacent and following stations, a bottom cutting knife unit, a side cutting knife unit, and a top cutting and pit ejecting unit, respectively.

A still further object of the invention is to provide a machine, as in the above paragraph, in which the main conveyor is substantially horizontal and said units cooperate with the holders at stations along the upper run thereof, there being a carry-off conveyor some distance below and substantially parallel to the lower run of said main conveyor, and a vertically movable transfer cradle unit operative, when elevated, to receive the fruit halves which are released from the holders on the main conveyor at a station along the lower run of the latter, and to then lower and deposit said halves, without bruising, onto the carry-off conveyor.

A further object of the invention is to provide a practical, efficient, and exceedingly effective device for the purpose for which it is designed.

These objects I accomplish by means of such structure and relative arrangement of parts as will fully appear by a perusal of the following specification and claims.

In the drawings similar characters of reference indicate corresponding parts in the several views:

Figure 4 is a fragmentary cross section of the machine, on line 4—4 of Fig. 1, showing the fruit depressing pad and the bottom cutting knife unit, at the beginning of an operating movement.

Figure 5 is a similar view, showing the pad fully depressed and the knife unit at the finish of its cutting movement.

Figure 6 is a perspective view of the bottom cutting knife unit, detached.

Figure 7 is a fragmentary transverse section on line 7—7 of Fig. 1, showing the side cutting knife unit in raised or non-operative position.

Figure 8 is a similar view showing the side cutting knife unit in an operative or cutting position.

Figure 9 is a fragmentary transverse section on line 9—9 of Fig. 1, showing the pit ejecting and top cutting unit in raised or non-operative position.

Figure 10 is a fragmentary longitudinal section of the machine, as on line 10—10 of Fig. 9, showing the pit ejecting unit in the same position as in Fig. 9, and also showing the movement-control mechanism for this and other fruit cutting units and the individual fruit holders.

Figure 15 is a fragmentary transverse elevation, substantially on line 15—15 of Fig. 14, showing the separate fruit retaining rods in operation and just prior to the automatic release of the same from the fruit.

Figure 16 is a fragmentary plan on line 16—16 of Fig. 15.

Figure 17 is a fragmentary transverse section on line 17—17 of Fig. 1 showing the mechanism to discharge the fruit halves from their holder and transfer such halves to the carry-off conveyor.

Figure 1:
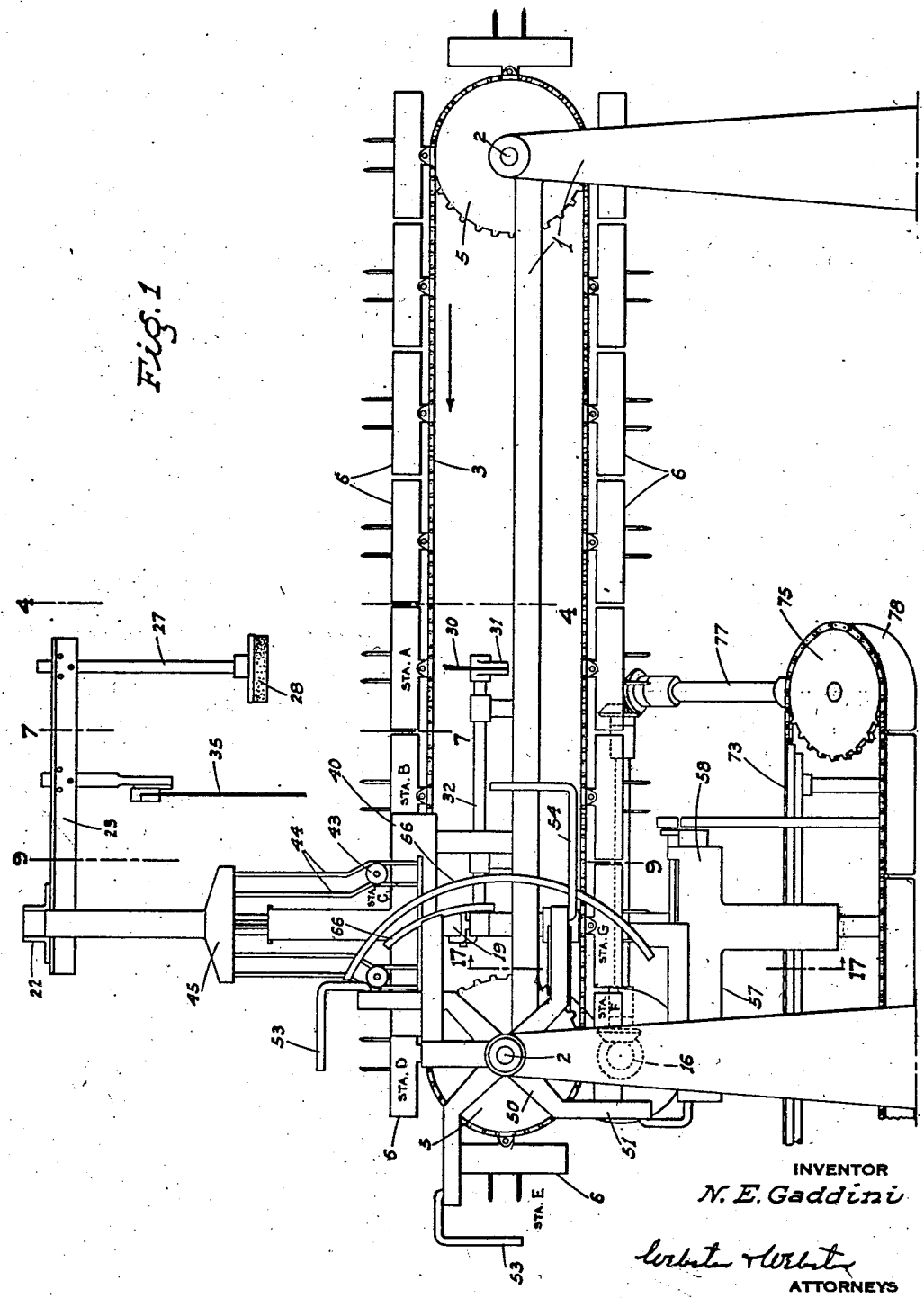
Figure 1 is a side elevation, somewhat diagrammatic, of the fruit halving and pitting machine.

Referring now more particularly to the characters of reference on the drawings, the numeral 1 indicates generally rigid upstanding side frames which carry longitudinally spaced cross shafts 2; said cross shafts supporting opposite ends of an endless conveyor 3 which includes transversely spaced, parallel chains 4 extending about corresponding sprockets 5 fixed on shafts 2.

Figure 2:
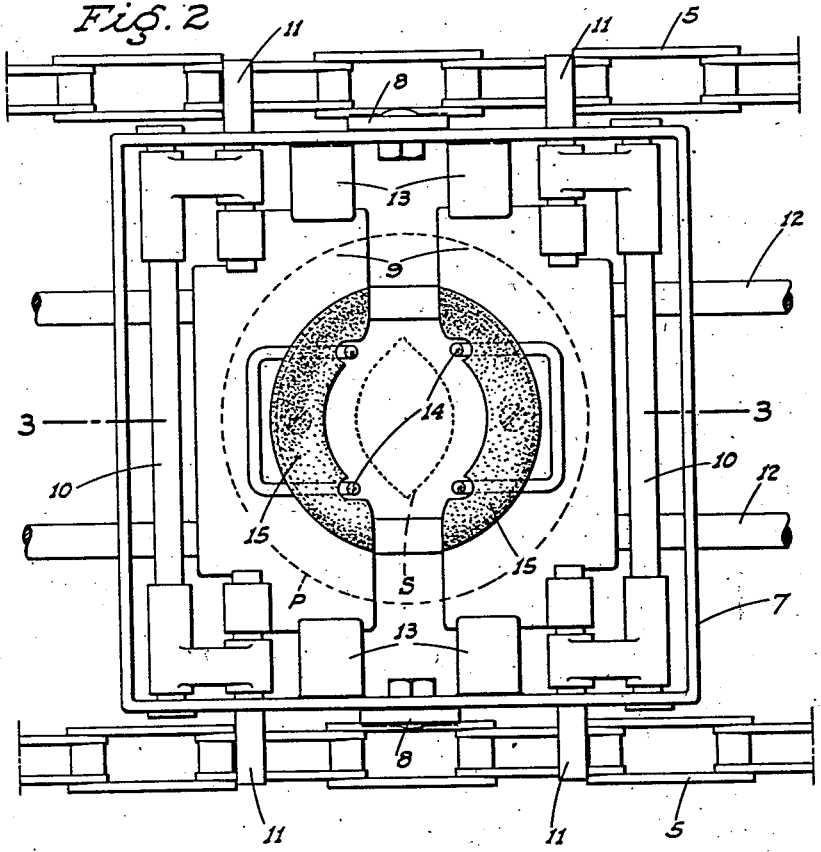
Figure 2 is a top plan view of an individual fruit holder.
Figure 3:
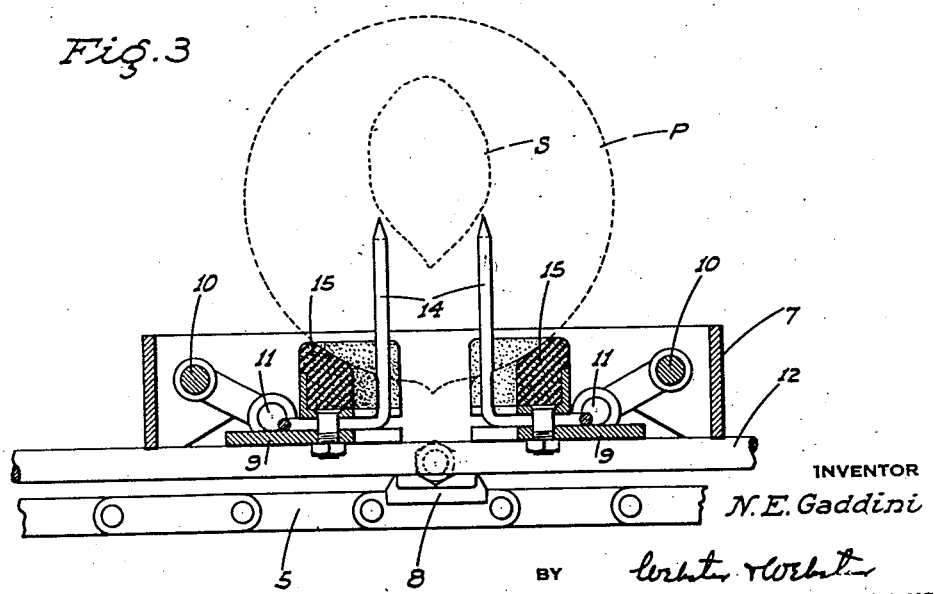
Figure 3 is a sectional elevation of the same on line 3—3 of Fig. 2.
Figure 12:
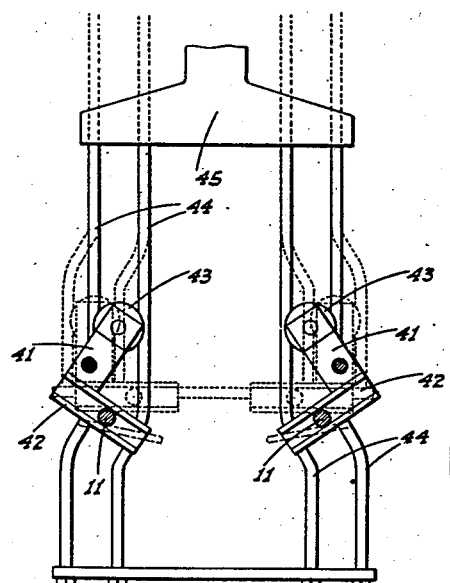
Figure 12 is a fragmentary detached side view of the base-plate angling unit, the normal position of the angling-control members being shown in dotted lines.

A plurality of fruit holders 6, each adapted to receive and support a single fruit, are mounted in end to end relation on conveyor 3. As shown particularly in Figs. 2 and 3, each such holder comprises a rectangular box frame 7, open top and bottom, connected at opposite sides and centrally of its ends to the corresponding chain 4 by attachment links 8. A pair of normally alined base plates 9 are disposed transversely in each box frame 7 in parallel but spaced relation, and adjacent their outer edges said plates are mounted in connection with turnable cross-rods 10 for downward swinging movement. Control pins 11 project laterally from opposite sides of each base plate and through cut-away portions of the sides of the box frame 7.

From the lead end of the upper run of conveyor 3 to a predetermined station adjacent its other end, the base plates 9 ride and are held alined by transversely spaced rods 12 disposed between the chains 4. When the holders are inverted and are on the lower run of the conveyor, the base plates rest against stops 13 in the box frame 7.

Each base plate 9 is provided, adjacent its inner edge and intermediate its ends with a pair of transversely spaced, outwardly projecting fruit receiving spikes 14; the pairs of spikes being adjustably mounted on the plates and in symmetrical relation to each other. The base plates are roundingly cut away between the spikes as shown, and correspondingly arcuate sponge or cushion pads 15 are mounted on the outside of said plates about the cut-away portions, said pads extending beyond the spikes towards the ends of the plates. The fruit, such as a peach P, to be halved and pitted is initially slightly impaled on spikes 14 by hand, with the stem up and suture crosswise; such impaling being done at a loading station adjacent the lead end of the upper run of the conveyor 3. The halving and pitting operations are carried out when the fruit holders 6 are stationary at certain longitudinally and equally spaced stations A, B, and C on said upper run beyond the loading station; said fruit holders 6 being progressively advanced from station to station by step-by-step movements of the conveyor, each step-by-step movement being equal in length to the distance between adjacent stations. This movement is accomplished as follows:

As shown particularly in Figs. 10 and 11, a main drive shaft 16, constantly driven by a motor unit (not shown), is journaled in frame 1 below one of the conveyor supporting shafts 2, and a Geneva movement 17 is operatively connected between said main shaft 16 and the adjacent conveyor shaft 2; the drive pin of such movement being indicated at 18. This Geneva movement converts constant rotary motion of said shaft 16 into the desired step-by-step movement of the conveyor 3, and in the direction indicated by the arrow in Fig. 1.

An upstanding post 19 is mounted laterally of conveyor 3 in the transverse plane of station C, and is supported from frame 1 by bearings 20 for vertical reciprocating movement; such reciprocating movement being imparted to the post 19 by a fixed, radially projecting arm 21 having a longitudinal slot therein in which the drive pin 18 of the Geneva movement constantly rides. As pin 18 traverses a rotary path, the arm 21 causes vertical reciprocation of post 19; said post approaching the upper end of its stroke each time the Geneva movement advances the conveyor one step or station, and the post being on or beginning its down stroke as each such movement of the conveyor is completed.

At its upper end, and some distance above the upper run of conveyor 3, the post is fitted with a fixed cross head 22 overhanging said run, and which cross head carries a rigid longitudinal beam 23, said beam being horizontal and of a length to extend from stations A to C.

This beam 23 carries, in dependent relation, a presser unit 24, a side cutting unit 25, and a top cutting and pit ejecting unit 26; said units being disposed in the vertical plane of and corresponding to stations A, B, and C, respectively (see Fig. 1).

The presser unit 24 (see Fig. 4) comprises a vertical rod 27 having a relatively thick pad 28 of sponge rubber or the like at its lower end. As each fruit holder 6 comes to a stop at station A, the presser unit 24 is then on its down stroke and shortly thereafter engages the previously partially impaled fruit P and forces the latter into a fully impaled position on spikes 14, as shown in Fig. 5. The pad 28 engages the fruit P before the end of the down stroke and during the remainder of the latter remains in firm contact with the fruit; the rod 27 then being stationary but spring-pressed as said rod is slidable relative to beam 23 but urged downwardly by a tension spring assembly 29.

After the fruit P is fully impaled, as above, a bottom cutting knife 30 swings transversely into the holder 6 from below and cuts through the fruit at the bottom, as shown in Fig. 5; such knife 30 being segmental and carried on a radial arm 31 fixed on a counter-shaft 32 actuated from post 19 by a slotted yoke and pin arrangement 33. The knife 30 is pivotally mounted and yieldable downwardly against a spring 34 in the event such knife strikes the pit or stone S of fruit P. The cutting edge of knife 30 is eccentric to countershaft 32, with the point of said knife closest to the latter whereby to permit of the above yielding or deflection and without said point jamming into the pit S.

Upon the next upward stroke of post 19, the pad 28 and knife 30 retract from the fruit, and the corresponding holder 6 is then advanced to station B above which the beam 23 supports the side cutting knife unit, as shown in Figs. 7 and 8. This comprises a pair of transversely spaced, vertically disposed knives 35; said knives being parallel, flatwise to the direction of travel of the conveyor, and spaced apart slightly less than the width of the pit S. The knives 35 are mounted by parallel links 36 on a crosshead 37 for parallel separating movement, and are normally urged toward each other by a connecting tension spring 38; the head 37 being adjustably suspended from beam 23 by a rod 39. The knives 35 are sharpened along adjacent edges, and are relatively pointed and sharpened on both edges adjacent their lower ends.

After each holder 6 has come to rest at station B, the above described side cutting unit lowers and knives 35 cut the fruit P on both sides of pit S; the cuts running inwardly directly to the pit S and from top to bottom of the fruit. The yieldable mounting of knives 35 compensates for different size pits, and as the fruit is firmly in position on spikes 14, the cuts made by bottom cutting knife 30 and side cutting knives 35 can be accurately alined. With operation of the side cutting unit 25, the fruit P has been completely cut around the suture with the exception of a small top portion adjacent the stem.

The holder 6, corresponding to the fruit thus cut, then advances to station C where the fruit is positioned for engagement by the top cutting and pitting unit, which comprises the following, as shown particularly in Figs. 9 to 12.

As station C each holder 6 is disposed in an open-ended, frame-supported trough 40; the base plate 9 having previously run off the supporting rods 12 which terminate adjacent but short of said trough, as shown in Fig. 10. At the sides the trough 40 carries pivotally mounted bellcranks 41 spaced to correspond to the control pins 11; one leg of each bellcrank being a channel 42 initially disposed horizontal so that the pins 11 ride thereinto when the holder 6 moves to station C. The other and upstanding leg of each bellcrank 41 carries a roller 43 which is engaged in corresponding cam tracks 44 depending from heads 45 suspended from beam 23, as shown in Fig. 10.

Figure 11:
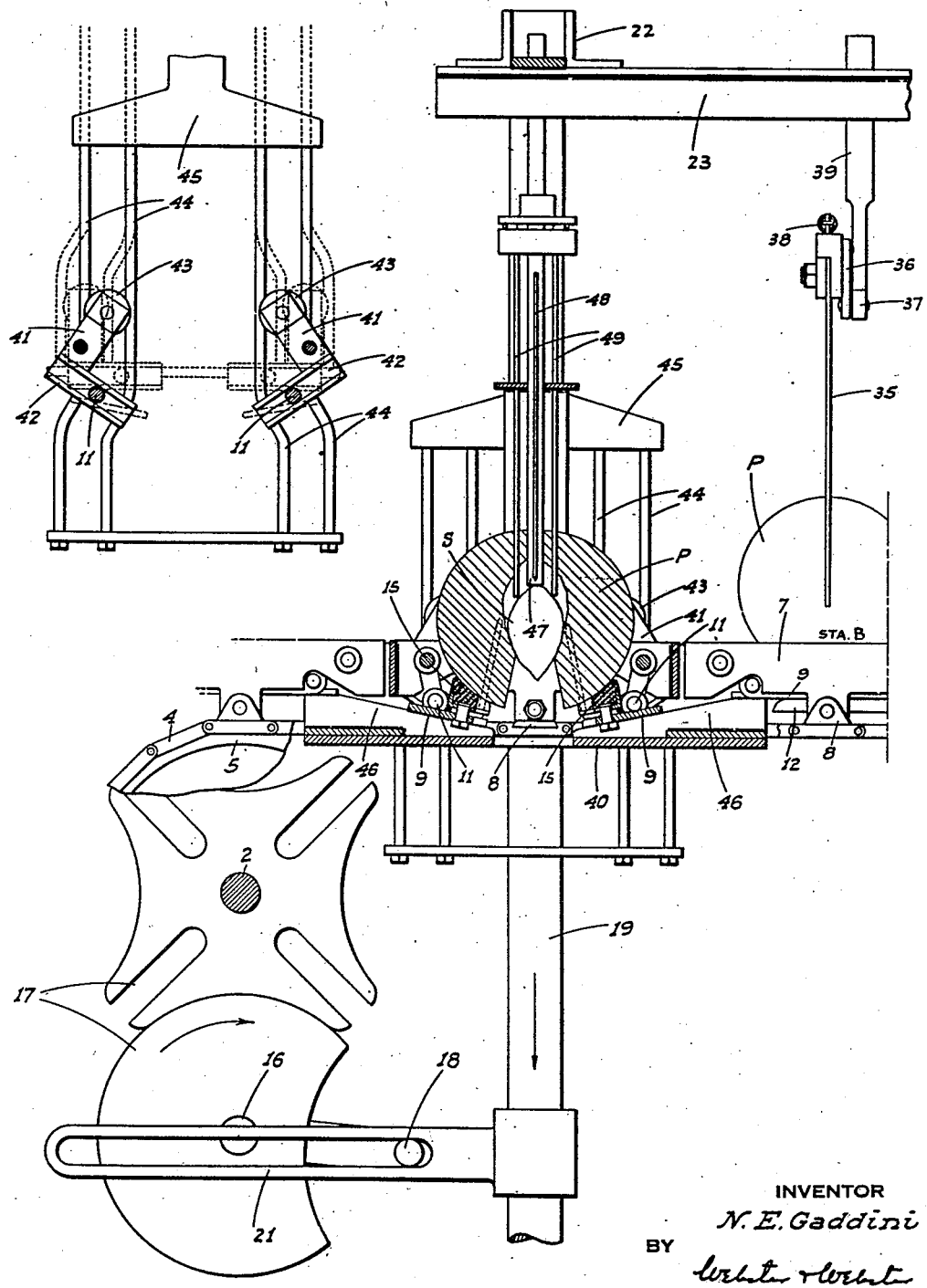
Figure 11 is a similar view, showing the pit ejector in operation on the fruit, and also showing pivoted base plates of the fruit holder as angled to spread the already cut fruit and facilitate the ejection of the pit.

Upon predetermined lowering of beam 23 after the holder 6 reaches station C, the cam tracks rotate the bellcranks 41 in a direction to swing the channels 42, pins 11 therein, and consequently the base plates 9, downward to a relative angled position, as shown in Fig. 11, and against longitudinal adjustable, correspondingly angular stops 46 mounted in the trough 40. When the base plates 9 are so angled, the halves of the partially cut fruit P, as impaled on the spikes 14, are separated at the bottom; the uncut top portion acting as a hinge. The cam tracks 44 are formed so that with continued lowering movement of beam 23, the plates 9 are held in such angled position, and such continued movement carries a top cutter and pit ejector unit through the fruit P. Such unit, which is rigidly suspended from beam 23, comprises a pit pushout rod 47 having diagonal-edged cutting knives 48 projecting transversely from opposite sides, and symmetrically spaced pit confining or stabilizing rods 49 grouped about rod 47, the latter being of slightly shorter length than said rods 49. With descent of the above unit, rods 49 first center the pit S and then the rod 47 pushes said pit out through the spread-apart bottom of the fruit; the knives 48 cutting the top of the latter to complete the full cut in the suture plane and to accomplish separation of the halves. Thereafter the top cutting and pit ejecting unit ascends, and simultaneously the cam tracks 44 return the base plates to alined position with the fruit halves in facing and matching relation.

After such unit clears the adjacent holder 6 on the up-stroke, the conveyor 3 moves such holder ahead one step to a station identified at D; such holders then progressing about the end of the conveyor to an intermediate station E and then to another station F in the lower run of said conveyor. As the holders move between stations D and F, the now separated fruit halves, becoming inverted, are held against escape from spikes 14 by the following mechanism, shown particularly in Figs. 13 to 16.

Figure 13:
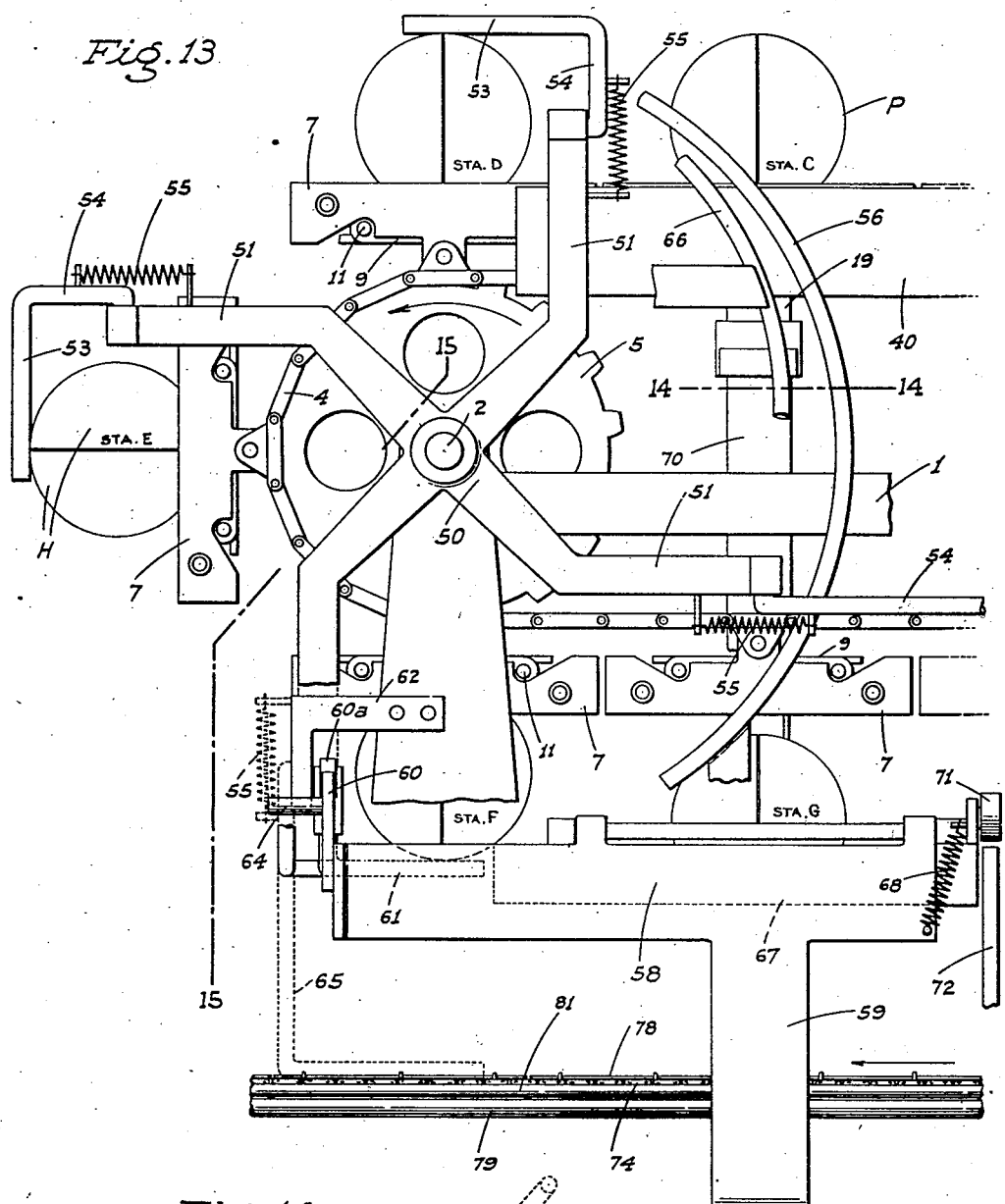
Figure 13 is a fragmentary side elevation of the machine, showing the means to retain the cut and separated fruit halves on their holders as the fruit is moved with the holders from an upright pit ejecting position to an inverted fruit discharge position.
Figure 14:
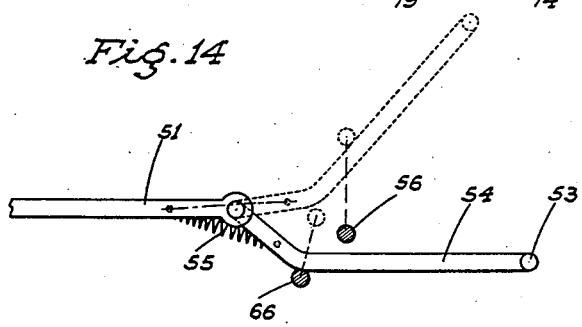
Figure 14 is a fragmentary sectional plan on line 14—14 of Fig. 13, illustrating the action of the guide rails on the fruit retaining means.

A symmetrical four-legged spider wheel 50 is fixed on the shaft 2, which is directly below station D; the legs 51 being of greater radius than the adjacent sprocket 5, and spaced apart a distance so that a corresponding leg is disposed alongside of and moves with each holder 6 near the trailing end thereof. Longitudinally extending fruit holding rods 53 are pivotally mounted, by means of integral lateral shanks 54, in connection with the outer ends of spider legs 51 for lateral snap action movement between a lateral position clear of the conveyor to a working position overhanging the conveyor and holders 6 in engagement with the outer end of the cut fruit P and across the plane of the cut therethrough, as shown in Fig. 13. Such snap action is accomplished by a tension spring 55 connected between each shank 54 and the corresponding leg 51.

The shanks 54 ride off the end of a frame mounted, arcuate guide rail 56 at substantially the time the holders 6 reach station D, whereupon the rods 53 snap into holding engagement with the cut fruit P and remain in such position, to prevent escape of the fruit, as said holders move to station E and thence to station F in the lower run of the conveyor.

Beneath said lower run of conveyor 3, and in substantially the vertical plane of station C, there is a vertically reciprocating transfer cradle unit, shown generally at 57 in Fig. 1, which includes, as shown in Figs. 13, 15, and 17, a frame including side plates 58, supported by a U-shaped, transversely extending yoke 59 fixed in connection with post 19 for reciprocation therewith. The timing of the apparatus is such that the transfer cradle 57, hereinafter described in more detail, is on the upstroke and adjacent but short of the top thereof, as each inverted holder 6 reaches station F. At this point in the upstroke a cam 60 fixed on the leading end of the transfer cradle engages a roller 60a on the outer end of the auxiliary, fruit holding rod 61 pivoted intermediate its ends to a fixed bracket 62; the auxiliary rod 61 being L-shaped and normally urged by a spring 63 in the direction of and for engagement with the fruit P in the holder at station F to one side of rod 53. When cam 60 engages with the auxiliary rod 61 as above, said rod is lowered at its inner or fruit engaging end sufficient to permit the fruit P to reach station F without obstruction. However, as soon as the transfer cradle 57 moves on its downstroke a short distance, the rod 61 is released from the cam 60 and engages the fruit P, then at station F, in holding relation.

As the transfer cradle 57 continues to lower, a pin 64 thereon strikes the shank 54 of the adjacent main fruit holding rod 53, which has moved into position below said pin when the transfer cradle was up, and snaps said rod 53 to its opposed position free of the conveyor and fruit, as shown at 65 in Fig. 15. The rods 53 remain in this free position, as the spider wheel 50 intermittently rotates, until again in overlying relation to guide rail 56; the rods 53 then being urged across dead center and with shanks 54 into engagement with said rail 56 intermediate its ends by a relatively short deflector rail 66. The shanks 54 then remain on rail 56 until again released therefrom at station D, as previously described.

The transfer cradle 57 includes, at the top and in transversely spaced relation, a pair of longitudinally extending cradle plates 67 hinged along their upper edges to corresponding edges of the side plates 58 and normally extending in downwardly converging, fruit supporting relation; springs 68 connected between the side plates 58 and ears 69 on the plates 67 above the hinge resisting downward swinging of the latter.

The cradle plates 67 are disposed so that their forward ends are close to the fruit engaging end portion of auxiliary fruit holding rod 61, whereby when the inverted holders 6 move from station F to the next station, identified at G, the fruit P as it escapes rod 61 immediately passes into overlying relation to said cradle plates.

After an inverted holder reaches station G, which occurs when the transfer cradle is elevated, said transfer cradle begins its next downstroke, and simultaneously a vertical pusher 70, fixedly supported from post 19 above the inverted holder, and between the upper and lower runs of conveyor 3, passes between the plates 9 of the latter and pushes the fruit halves H from spikes 14 so that said halves fall onto cradle plates 67, as shown in Fig. 17; the halves tending to lie cut side uppermost and in longitudinally alined relation on said plates.

With continued lowering movement of the transfer cradle, rollers 71 on ears 69 of cradle plates 67, engage fixed cams 72 which cause said cradle plates 67 to progressively separate. Before reaching the lower end of the down stroke, plates 67 lie flat against side plates 58, and the fruit halves H fall onto a continuously moving carry-off conveyor, indicated generally at 73 in Fig. 1, and the upper run of which extends horizontally through yoke 59; the then flat lying plates 67 clearing the sides of said conveyor.

The carry-off conveyor includes endless chains 74 which at one end run on diagonally disposed sprockets 75 connected by a common drive unit 76 which includes a drive shaft 77. A multiplicity of flexible and resilient conveyor plates 78 are hinged, in end to end relation, to the chains 74 with the conveyor plates on the separate chains in inwardly converging relation; said flexible and resilient conveyor plates being supported, along the upper run of the conveyor, by fixed, horizontal rods 79 disposed therebeneath and mounted on standards 80 which include chain channels 81. As so supported, the conveyor plates 78 receive the fruit halves H from the transfer cradle 57, and convey said halves, with the cut side remaining uppermost, to a point for further processing.

While the apparatus herein shown and described is adjusted to receive and handle fruit of the size of a peach, the various parts of such apparatus are designed, where necessary, for ready adjustment whereby smaller fruit, such as apricots, may be cut, pitted, and distributed on the carry-off conveyor, all as an automatic operation.

It should also be noted that at no point in the apparatus is the fruit subject to any severe bumping nor dropped any appreciable distance, and as a consequence bruising is reduced to a minimum and very soft fruit can, if necessary, be handled by the apparatus.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. Fruit machinery comprising, in combination, a conveyor assembly adapted to fixedly but releasably support and convey stone fruit in a row, means successively cooperating with the fruit at spaced stations along the conveyor assembly arranged to first partially cut the fruit into halves at one station and to then complete the cut and substantially simultaneously eject the pit from between said halves at another station, and means to release the halves and discharge the same from the conveyor assembly at a third station beyond said fruit cutting and pitting stations.

2. Fruit machinery comprising, in combination, a conveyor assembly adapted to fixedly but releasably support and convey stone fruit in a row, means cooperating with the conveyor assembly to partially cut the fruit into halves, other means cooperating with the conveyor assembly beyond said cutting means operative to first spread apart the halves of the fruit at the partial cut and to then complete the cut and eject the pit from between the halves where spread apart, and means to release the halves and discharge the same from the conveyor assembly at a third station beyond said other station.

3. Fruit machinery comprising, in combination, a conveyor assembly adapted to fixedly but releasably support and convey stone fruit in a row, for cutting into halves and pitting, means cooperating with the conveyor assembly at one station to cut through the fruit transversely at one end and to the pit, separate means cooperating with the conveyor assembly at another station beyond said fruit end cutting station to simultaneously cut through the fruit transversely on opposite sides of and to the pit, and other means cooperating with the conveyor assembly at a further station therealong to cut through the fruit transversely at its other end and to the pit, and to simultaneously eject the pit from between the fruit halves at said one end of the latter, all of said cuts being in alinement transversely of the fruit, whereby the halves of the fruit are separated, and means beyond said stations to release the halves and discharge the same from the conveyor assembly.

4. Fruit machinery comprising, in combination, a conveyor assembly adapted to fixedly but releasably support and convey stone fruit in a row for cutting into halves and pitting, means cooperating with the conveyor assembly at one station to cut through the fruit transversely and to the pit, separate means cooperating with the conveyor assembly at another station beyond said fruit end cutting station to simultaneously cut through the fruit transversely on opposite sides of and to the pit, other means cooperating with the conveyor assembly at a further station therealong to first spread apart the fruit halves at said one end and then simultaneously cut through the fruit transversely at its other end and eject the pit from between the spread apart halves at said one end, all of said cuts being in the same plane transversely of the fruit whereby the fruit halves are separated, and means beyond said stations to release the halves and discharge the same from the conveyor assembly.

5. Fruit machinery comprising, in combination, an endless conveyor having a plurality of equally spaced fruit holders mounted thereon and each adapted to fixedly but releasably support a single stone fruit, means to advance the conveyor with step-by-step movement so that the holders successively progress to and remain stationary for a given time at predetermined stations along the conveyor, mechanisms mounted adjacent the conveyor operative to engage the fruit successively at said stations whereby to halve and pit said fruit, and means to release the fruit halves from said holders and discharge said halves from the conveyor at a point beyond said mechanisms; said mechanisms comprising, at adjacent and following stations, a fruit end cutting knife unit operative to cut through the fruit transversely at one end and to the pit, a fruit side cutting unit operative to cut through the fruit transversely on opposite sides of and to the pit, and a fruit end cutting and pit ejecting unit operative to cut through the fruit transversely at its opposite end and to eject the pit from between the fruit halves, all of said cutting units being disposed so that the cuts are made in alinement whereby the fruit halves are separated.

6. Fruit machinery as in claim 5 in which said holders include separate, relatively movable supporting members each carrying a fixed spike upon which a corresponding half of the fruit is impaled, means maintaining said members against relative movement when said holders are disposed, successively, at said one end cutting station and side cutting station, and other means operative to cause relative movement of said members in a direction to spread apart the fruit halves at said one end immediately prior to operation of said opposite end cutting and pit ejecting unit, the pit being ejected between the fruit halves at said spread apart end.

7. Fruit machinery comprising, in combination, an endless conveyor having a plurality of equally spaced fruit holders mounted thereon and each adapted to fixedly but releasably support a single stone fruit, means to advance the conveyor with step-by-step movement so that the holders successively progress to and remain stationary for a given time at predetermined stations along the conveyor, mechanisms mounted adjacent the conveyor operative to engage the fruit successively at said stations whereby to halve and pit said fruit, and means to release the fruit halves from said holders and discharge said halves from the conveyor at a point beyond said mechanisms; said mechanisms including, at one station, a fruit side cutting unit comprising a reciprocating knife unit having a pair of opposed knives mounted in spaced relation to each other and for yielding movement away from each other, said knives being sharpened at their adjacent edges and outer ends, and means mounting and actuating said knife unit to cut, on one stroke, through the fruit transversely on opposite sides of and between the stone.

8. Fruit machinery comprising, in combination, an endless conveyor having a plurality of equally spaced fruit holders mounted thereon and each adapted to fixedly but releasably support a single stone fruit, means to advance the conveyor with step-by-step movement so that the holders successively progress to and remain stationary for a given time at predetermined stations along the conveyor, mechanisms mounted adjacent the conveyor operative to engage the fruit successively at said stations whereby to halve and pit said fruit, and means to release the fruit halves from said holders and discharge said halves from the conveyor at a point beyond said mechanisms; said mechanisms including, at one station, a reciprocating, fruit end cutting and pit ejecting unit comprising a blade positioned so that upon one stroke of the unit to cut through the fruit transversely at one end, and a pit ejecting rod positioned so that upon continuance of the same stroke to engage and eject the pit from between the fruit halves, said rod being surrounded by a plurality of parallel spaced rods of greater length adapted to engage about and guide the pit as it is ejected.

9. Fruit machinery comprising, in combination, an endless, horizontal conveyor having a plurality of equally spaced fruit holders mounted thereon, each holder being adapted to fixedly and releasably support a single, stone fruit exposed at its inner end, sides, and outer end, power driven means to advance the conveyor with step-by-step movement so that the holders successively progress to and remain stationary for a given time at predetermined stations along the conveyor, a vertical post mounted for and constantly reciprocated alongside the conveyor adjacent said stations, said post being timed to lower when said holders are stationary, and mechanisms carried in part by said post operative to engage the fruit successively at said stations, said mechanisms being arranged to partially cut the fruit into halves, and to spread the halves apart and to complete the cut and eject the pit, at different stations, and means to release the fruit halves from said holders and discharge said halves from the conveyor at a point beyond said mechanisms.

10. Fruit machinery comprising, in combination, an endless, horizontal conveyor having a plurality of equally spaced fruit holders mounted thereon, each holder being adapted to fixedly and releasably support a single, stone fruit exposed at its inner end, sides, and outer end, power driven means to advance the conveyor with step-by-step movement so that the holders successively progress to and remain stationary for a given time at predetermined stations along the conveyor, a vertical post mounted for and constantly reciprocated alongside the conveyor adjacent said stations, said post being timed to lower when said holders are stationary, and mechanisms carried in part by said post operative to engage the fruit successively at said stations, whereby to halve and pit said fruit, and means to release the fruit halves from said holders and discharge said halves from the conveyor at a point beyond said mechanisms; said mechanisms including, in connection with the post and for engagement with the fruit at adjacent and following stations, a fruit presser unit, a fruit side cutting unit operative to cut through the fruit transversely on opposite sides, and a fruit end cutting and pit ejecting unit operative to cut through the fruit transversely at one end and to eject the pit from between the halves at the other end of the fruit, there being a power actuated knife operative to cut through the fruit transversely at said other end upon engagement of said presser unit with the fruit, and all of said cuts being alined whereby the fruit halves are separated from each other.

11. Fruit machinery comprising, in combination, an endless, horizontal conveyor having a plurality of equally spaced fruit holders mounted thereon, each holder being adapted to fixedly and releasably support a single, stone fruit exposed at its inner end, sides, and outer end, power driven means to advance the conveyor with step-by-step movement so that the holders successively progress to and remain stationary for a given time at predetermined stations along the conveyor, a vertical post mounted for and constantly reciprocated alongside the conveyor adjacent said stations, said post being timed to lower when said holders are stationary, and mechanisms carried in part by said post operative to engage the fruit successively at said stations, whereby to halve and pit said fruit, and means to release the fruit halves from said holders and discharge said halves from the conveyor at a point beyond said mechanisms; each holder comprising a frame open top and bottom, a pair of fruit supporting plates mounted transversely in the frame in spaced relation lengthwise of the conveyor, and spikes upstanding from said plates and on which corresponding halves of the fruit are impaled; said mechanisms including a yieldable presser unit mounted in connection with the post and disposed at one station, said presser unit being adapted to engage the outer end of the fruit upon the down stroke of the post, and a swinging knife mounted to pass, when actuated, between the holder plates and to cut through the bottom of the fruit transversely, and means to actuate said knife upon engagement of the presser unit with the fruit and upon continuance of the downstroke of the post.

12. Fruit machinery comprising, in combination, an endless, horizontal conveyor having a plurality of equally spaced fruit holders mounted thereon, each holder being adapted to fixedly and releasably support a single, stone fruit exposed at its inner end, sides, and outer end, power driven means to advance the conveyor with step-by-step movement so that the holders successively progress to and remain stationary for a given time at predetermined stations along the conveyor, a vertical post mounted for and constantly reciprocated alongside the conveyor adjacent said stations, said post being timed to lower when said holders are stationary, and mechanisms carried in part by said post operative to engage the fruit successively at said stations, whereby to halve and pit said fruit, and means to release the fruit halves from said holders and discharge said halves from the conveyor at a point beyond said mechanisms; each holder comprising a frame open top and bottom, a pair of fruit supporting plates mounted transversely in the frame in spaced relation lengthwise of the conveyor, and spikes upstanding from said plates and on which corresponding halves of the fruit are impaled; said mechanisms including a fruit side cutting unit mounted for reciprocation with the post and disposed at one station, said side cutting unit comprising a head, a pair of opposed blades depending from said head and mounted thereon for yielding movement laterally of the conveyor, said blades being sharpened at their lower end and adjacent edges and operative upon the down stroke of the post to cut through the fruit on opposite sides of the pit and in a transverse plane between said plates.

13. Fruit machinery comprising, in combination, an endless, horizontal conveyor having a plurality of equally spaced fruit holders mounted thereon, each holder being adapted to fixedly and releasably support a single, stone fruit exposed at its inner end, sides, and outer end, power driven means to advance the conveyor with step-by-step movement so that the holders successively progress to and remain stationary for a given time at predetermined stations along the conveyor, a vertical post mounted for and constantly reciprocated alongside the conveyor adjacent said stations, said post being timed to lower when said holders are stationary, and mechanisms carried in part by said post operative to engage the fruit successively at said stations, whereby to halve and pit said fruit, and means to release the fruit halves from said holders and discharge said halves from the conveyor at a point beyond said mechanisms; each holder comprising a frame open top and bottom, a pair of fruit supporting plates mounted transversely in said frame in spaced relation lengthwise of the conveyor and for downward swinging movement at their adjacent edges, spikes upstanding from said plates and on which spikes corresponding halves of the fruit are impaled, the fruit upon reaching a certain one of said stations having been previously cut through, by certain of said mechanisms, transversely at the bottom and at opposite sides in the same transverse plane, said plane extending between said plates, means including cam tracks mounted in connection with the post and operative on the down stroke thereof to swing said plate downward and spread the fruit halves at the bottom when said holders are at said certain station, and other means mounted in connection with the post and operative upon continuance of the same down stroke thereof to cut the fruit through transversely at the top in said plane and to eject the pit from between the spread-apart halves at the bottom.

14. Fruit machinery comprising, in combination, an endless conveyor assembly having upper and lower runs and end sprockets about which the conveyor extends, a plurality of fruit holders mounted on the conveyor in spaced relation, the holders including outwardly projecting spikes on which the fruit is impaled, each holder being adapted to support a single fruit, means successively cooperating with the holders in the upper run of the conveyor to cut the fruit in half, each half then being spike supported, fruit-half retaining means cooperating with the halves as they traverse the sprocket supported end of the conveyor from the upper to lower run of the latter, said retaining means being operative to prevent escape of the fruit halves from the spikes during such traversing movement of the holders, and means to discharge the fruit halves from the inverted holders at a predetermined point in said lower run.

15. Fruit machinery comprising, in combination, an endless conveyor assembly having upper and lower runs and end sprockets about which the conveyor extends, a plurality of fruit holders mounted on the conveyor in spaced relation, the holders including outwardly projecting spikes on which the fruit is impaled, each holder being adapted to support a single fruit, means successively cooperating with the holders in the upper run of the conveyor to cut the fruit in half, each half then being spike supported, fruit-half retaining means cooperating with the halves as they traverse the sprocket supported end of the conveyor from the upper to lower run of the latter, said retaining means being operative to prevent escape of the fruit halves from the spikes during such traversing movement of the holders, and means to discharge the fruit halves from the inverted holders at a predetermined point in said lower run; said fruit half retaining means comprising a radial spider mounted concentrically adjacent and rotatable with said sprocket supported end of the conveyor, a snap action finger pivotally mounted on the outer end portion of each arm of the spider and said arms moving in adjacent corresponding relation to the holders, said fingers being formed so that when snapped in one direction to engage over and retain the fruit halves on the spikes, and when snapped in the opposite direction to clear the holders and fruit halves, means to snap said fingers into fruit half retaining position when the holders begin said traversing movement, and other means to snap the fingers clear of the holders when the latter reach the lower run of the conveyor.

16. Fruit machinery comprising, in combination, an endless conveyor having upper and lower runs, fruit holders mounted on the conveyor in equally spaced relation, means to advance the conveyor step by step, means successively cooperating with the holders in the upper run to halve fruit held thereby, means to prevent escape of the halves from the holders as the latter traverse one end of the conveyor from the upper to the lower run, a carry-off conveyor mounted beneath said lower run, a power actuated transfer cradle unit mounted for timed vertical reciprocating movement between a point adjacent and below said lower run to a point adjacent and above said carry-off conveyor, the holders in said lower run successively moving to a position above the transfer cradle unit, means to release the fruit halves from the holders at said position and when the transfer cradle unit is adjacent thereto, and other means to release the fruit halves from the transfer cradle unit when the latter is adjacent the carry-off conveyor.

17. Fruit machinery, as in claim 16, in which said transfer cradle unit includes a frame, a pair of cradle plates pivotally mounted in the frame in parallel, downwardly converging relation, and for movement away from each other, means normally holding said plates against separating movement, and other means, operative upon the transfer cradle unit approaching said carry-off conveyor, to swing said plates away from each other whereby to discharge supported fruit halves onto said carry-off conveyor.

NORMAN E. GADDINI.